United States Patent Office 3,310,525
Patented Mar. 21, 1967

3,310,525
ULTRAVIOLET LIGHT STABILIZED POLYESTER
AND POLYOLEFIN COMPOSITIONS
Gerald R. Lappin and John W. Tamblyn, Kingsport,
Tenn., assignors to Eastman Kodak Company, Rochester, N.Y., a corporation of New Jersey
No Drawing. Filed Apr. 22, 1966, Ser. No. 544,412
9 Claims. (Cl. 260—45.95)

This is a continuation-in-part of our two copending U.S. patent application, Ser. Nos. 267,316 and 267,318, filed Mar. 22, 1963, both now abandoned.

This invention relates to synthetic resins. More particularly, it relates to the problem of protecting polyesters and poly-α-olefins from the adverse effects of ultraviolet light.

Normally solid poly-α-olefins such as the well known normally solid polyethylene and crystalline polypropylene are thermoplastic, synthetic resins which have gained widespread use as materials of construction. However, as is well known, normally solid poly-α-olefins undergo a photochemical degradation when exposed to ultraviolet light such as that in sunlight. This effect is frequently termed "weathering." It appears to be a photo-oxidation process which causes rupture of the polymer chains and formation of carbonyl (=C=O) groups. As this degradation progresses, articles manufactured from poly-α-olefins tend to crack, become brittle and lose tensile strength to the extent of mechanical failure.

Similarly, polyesters, as is well known in the art, are normally solid, thermoplastic, polymeric materials obtained as by the esterification of polyhydric alcohols and polybasic carboxylic acids. They have achieved widespread use in fibers, films, structural elements and the like. They present a problem, however, in that they are adversely affected by ultraviolet light such as that in sunlight. For example, after prolonged exposure to ultraviolet light, polyester films tend to become brittle and crack upon flexure. Early evidence of such degradation is surface dulling of the polyester resin.

One approach to this problem of ultraviolet light degradation of polyester resins has been to incorporate into them additives which have been found to function in polyesters to inhibit ultraviolet light degradation of them.

Certain kinds of compounds are known to function as inhibitors of ultraviolet light degradation of polyesters. Well known amongst such compounds are the 2'-hyrdoxybenzophenones. However, all commercial 2'-hydroxybenzophenone compounds are yellow and impart at least some degree of yellowness to polyester compositions in which they are incorporated. Moreover, most commercial 2'-hydroxybenzophenone compounds are relatively unstable at temperatures normally encountered in the processing of polyester compositions into useful articles. It is desirable to incorporate the ultraviolet light stabilizer into the polyester composition at the earliest stage possible in order to obtain uniform dispersion without special milling. It is most desirable to add the ultraviolet light stabilizer to the mixture of monomers before they are polymerized. It is somewhat less desirable, but, nevertheless, can and should be done if not done previously, to add the ultraviolet light stabilizer to the polyester resin after it has formed but before it is extruded into a fiber or film or before it is molded. When the commercial 2'-hydroxybenzophenones are added to the monomers before polymerization, the resulting resin has an undesirable yellow to brown color. A similar, although lesser, color formation occurs if the additive is added after polymerization but before extrusion or molding. This formation of color in each case appear to be a result of decomposition of the ultraviolet light stabilizer. When such color appears, the effectiveness of the ultraviolet light stabilizer has been substantially reduced.

This invention provides a solution to these problems.

In summary, this invention can be considered in two separate aspects: In the first aspect, this invention comprises a normally solid, α-olefin resin containing at a protective concentration, a special additive which is effective to protect it relative to ultraviolet light, which additive is heat stable under normal processing conditions. In the second aspect, this invention comprises a polyester composition containing, at a protective concentration, the same additive.

This invention is based upon the discovery that certain α,ω - bis(2 - hydroxybenzoyl)alkanes are colorless compounds which are highly effective ultraviolet light stabilizers for polyesters and poly-α-olefin resins, generally, and are stable under normal processing conditions to which such polymeric materials in general are subjected in making useful articles from them.

In summary, this invention comprises a normally solid plastic composition consisting essentially of a normally solid, polyester portion and at a protective concentration relative to ultraviolet light. The α,ω-bis(2-hydroxybenzoyl)alkane stabilizer of the present invention have the formula:

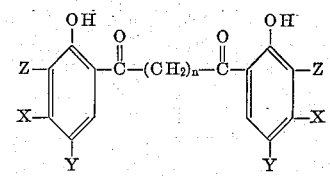

wherein $n$ is an integer in a range from 2 to 8, and X, Y and Z are independently selected from the group of hydrogen, $C_1-C_4$ alkoxy and $C_1-C_4$ alkyl radicals.

α,ω-bis(2-hydroxybenzoyl)alkanes represented by the formula are compounds which are readily made. They can be synthesized by a double Fries rearrangement of the corresponding aryl esters of dicarboxylic acids. See, for instance, Fernelius et al., J. Am. Chem. Soc., 80, 5864 (1958). Typical examples of the α,ω-bis(2-hydroxybenzoyl)alkanes of this invention and typical melting points therefor are as follows:

|  | ° C. |
|---|---|
| 1,2-bis(2-hydroxy-5-methylbenzoyl)ethane | 188–190 |
| 1,4-bis(2-hydroxy-4-methylbenzoyl)-n-butane | 124–128 |
| 1,4-bis(2-hydroxy-5-methylbenzoyl)-n-butane | 165–166 |
| 1,4 - bis(2 - hydroxy - 3 - t - butyl - 5 - methylbenzoyl)-n-butane | 96–98 |
| 1,6-bis(2-hydroxy-5-methylbenzoyl)-n-hexane | 137–138 |
| 1,8 - bis(2 - hydroxy - 4 - methoxybenzoyl) - n-octane | 95–106 |
| 1,8-bis(2-hydroxy-5-methylbenzoyl)-n-octane | 124–125 |

The α,ω-bis(2-hydroxybenzoyl)alkanes of this invention generally are colorless compounds both as pure solids and in the specific plastic compositions of this invention. Moreover, these compounds are compatible with polyesters and poly-α-olefins in that they do not exude or "bloom" therefrom. Still another feature of advantage of the compounds of this invention is that they have a high degree of heat stability.

Concentration of the α,ω-bis(2-hydroxybenzoyl)alkane of this invention in the normally solid plastic composition depends in general upon the degree of ultraviolet light stabilization desired. This in turn depends upon a number of factors including subsequent environmental conditions to which the plastic composition is intended to be exposed. In general, a concentration of the α,ω-bis(2-hydroxybenzoyl)alkane of this invention in a range from about 0.1 to 10% by weight of the total polymeric (polyester and/or poly-α-olefin) content of the plastic composition is an effective concentration for most end uses of the composition and gives satisfactory results.

The normally solid, plastic compositions of this invention can also comprise other additives such as, for example, antioxidants, thermal stabilizers, anticorrosion additives, antistatic agents, foaming agents, plasticizers, colorants such as dyes and pigments, waxes, mold release agents, slip agents, antiblocking agents, fillers, extenders, and the like, including physical property improvers other than polymeric compounds.

The normally solid plastic composition of this invention is made by incorporating at least one of the α,ω-bis(2-hydroxybenzoyl)alkanes of this invention into the normally solid resin portion of the composition. Generally, such incorporation is performed by any of a number of known methods, such as roll compounding, extrusion, solvent mixing and the like, which will result in a uniform dispersion of the α,ω-bis(2-hydroxybenzoyl) alkanes in the resin portion. For example, such incorporation can be performed by heating or otherwise softening the normally solid resin portion to a workable consistency and then working in, as by roll compounding, the α,ω-bis(2-hydroxybenzoyl)alkane until a substantially uniform blend or dispersion is obtained. Generally, such incorporation takes place at the same time that other additives are normally incorporated into the resin portion of the composition and usually along with such other additives as the particular plastic composition formulation may require.

The plastic compositions of this invention are useful in coatings and as a material of construction for shaped articles. Thus, specific embodiments of the composition can be made into various shaped articles such as, for example, pellets, sheeting, films, bars, tubes, filaments, fibers, specially shaped structural elements and the like as by conventional casting and molding techniques which include extrusion, blow molding and the like.

THE POLY-α-OLEFIN STABILIZING ASPECT OF THE INVENTION

The normally solid, α-olefin resin portion of this aspect of the normally solid plastic compositions of this invention consists essentially of at least one, normally solid, α-olefin polymer. Such a polymer, commonly referred to generically as a poly-α-olefin, is one which is derived from an α-monoolefinic hydrocarbon having 2–10 carbon atoms. Such a polymer is provided by the normally solid homopolymers of α-monoolefinic hydrocarbons having generally 2–10 carbon atoms, preferably 2–6 carbon atoms and usually 2–4 carbon atoms. It is also provided by the normally solid copolymers (which include graft polymers, addition polymers, block polymers and the like) of α-monoolefinic hydrocarbons having generally 2–10 carbon atoms; preferably 2–6 carbon atoms and usually 2–4 carbon atoms, as well as of these α-monoolefinic hydrocarbons and other compounds. Examples of a normally solid polymer derived from an α-monoolefinic hydrocarbon having 2–10 carbon atoms include the linear and branched, low density and high density, crystalline and amorphous, normally solid, homopolymers and copolymers of ethylene, propylene, 1-butene, isobutylene, 1-pentene, 2-methyl-1-pentene, 3-methyl-1-butene, 1-hexene, 3,3-dimethyl-1-butene, 1-heptene, 1-octene, 1-nonene, 1-decene, 4-methyl-1-pentene, 4-methyl-1-hexene, 5-ethyl-1-hexene, 6-methyl-1-heptene, 6-ethyl-1-heptene, styrene, allyl benzene and the like. Processes for preparing a normally solid α-olefin polymer are well known and described in detail in the prior art. See, for example, the U.S. Patent, No. 2,153,553, to Fawcett et al., the U.S. Patent, No. 2,912,429, to Cash and the U.S. Patent No. 2,917,500, to Hagemeyer et al. In general, a normally solid, α-olefin polymer, is a thermoplastic material which at 20° C. is solid. It includes the so-called poly-α-olefin waxes which usually have average molecular weights in a range from about 3,000 to about 12,000, and which at 20° C. are wax-like.

The normally solid, α-olefin resin portion of the poly-α-olefin composition of this invention, in addition to at least one normally solid, α-olefin polymer, can also comprise other polymeric components. Thus, it can comprise a normally solid polymer derived from another α-monoolefinic hydrocarbon having 2–10 carbon atoms. It can comprise a different kind of polymer, generally present as a physical property improver.

The poly-α-olefin stabilizing aspect of the present invention is further illustrated by the following examples of specific embodiments of the invention. This aspect of the invention, however, is not limited to these specific embodiments unless otherwise indicated.

EXAMPLES 1–7

These examples illustrate specific embodiments of a polyethylene composition of this invention. The formulations of these specific embodiments are—

*Example 1 formulation*

| Components: | Parts by wt. |
|---|---|
| Normally solid polyethylene | 100 |
| 1,2-bis(2-hydroxy-5-methylbenzoyl)ethane | 1 |

*Example 2 formulation*

| Components: | |
|---|---|
| Normally solid polyethylene | 100 |
| 1,4-bis(2-hydroxy-4-methylbenzoyl)-n-butane | 1 |

*Example 3 formulation*

| Components: | |
|---|---|
| Normally solid polyethylene | 100 |
| 1,4-bis(2-hydroxy-5-methylbenzoyl)-n-butane | 1 |

*Example 4 formulation*

| Components: | |
|---|---|
| Normally solid polyethylene | 100 |
| 1,4-bis(2-hydroxy-3-t-butyl-5-methylbenzoyl)-n-butane | 1 |

*Example 5 formulation*

| Components: | |
|---|---|
| Normally solid polyethylene | 100 |
| 1,6-bis(2-hydroxy-5-methylbenzoyl)-n-hexane | 1 |

*Example 6 formulation*

| Components: | |
|---|---|
| Normally solid polyethylene | 100 |
| 1,8-bis(2-hydroxy-4-methoxybenzoyl)-n-octane | 1 |

*Example 7 formulation*

| Components: | |
|---|---|
| Normally solid polyethylene | 100 |
| 1,8-bis(2-hydroxy-5-methylbenzoyl)-n-octane | 1 |

The specific polyethylene composition according to these formulations are prepared by hot roll compounding the compounds for 4 minutes, the temperature of the front roll being held at 270° F. and the temperature of the rear roll being at 220° F. The resulting roll mix can then be compression molded into flat plates, sheets and the like.

EXAMPLES 8–14

These examples illustrate specific embodiments of a polypropylene composition of this invention.
The formulations of these specific embodiments are—

*Example 8 formulation*

| Components: | Parts by wt. |
|---|---|
| Crystalline polypropylene | 100 |
| 1,2-bis(2-hydroxy-5-methylbenzoyl)ethane | 1 |

*Example 9 formulation*

| Components: | |
|---|---|
| Crystalline polypropylene | 100 |
| 1,4-bis(2-hydroxy-4-methylbenzoyl)-n-butane | 1 |

Example 10 formulation

Compositions: Parts by wt.
Crystalline polypropylene _____ 100
1,4-bis(2-hydroxy-5-methylbenzoyl)-n-butane _ 1

Example 11 formulation

Components:
Crystalline polypropylene _____ 100
1,4 - bis(2 - hydroxy - 3 - t - butyl - 5 - methyl-
benzoyl)-n-butane _____ 1

Example 12 formulation

Components:
Crystalline polypropylene _____ 100
1,6-bis(2-hydroxy-5-methylbenzoyl)-n-hexane _ 1

Example 13 formulation

Components:
Crystalline polypropylene _____ 100
1,8 - bis(2 - hydroxy - 4 - methoxybenzoyl) - n
octane _____ 1

Example 14 formulation

Components:
Crystalline polypropylene _____ 100
1,8 - bis(2 - hydroxy - 5 - methylbenzoyl) - n-
octane _____ 1

The specific compositions of the foregoing formulations are made by admixing the components for 5 minutes at 325° F. under a nitrogen atmosphere in a C. W. Brabender Plastograph. The resulting slab is granulated. The granules thus obtained can then be injection molded into plates, films and the like.

EXAMPLES 15–16

These examples illustrate specific embodiments of a poly(1-butane) composition of this invention.
The formulations of these specific compositions are as follows.

Example 15 formulation

Components: Parts by wt.
Normally solid poly(1-butene) _____ 100
1,4-bis(2-hydroxy-5-methylbenzoyl)-n-butane _ 1

Example 16 formulation

Components:
Normally solid poly(1-butene) _____ 100
1,8 - bis(2 - hydroxy - 5 - methylbenzoyl) - n-
octane _____ 1

The specific compositions of these formulations are prepared by hot roll compounding the components for 4 minutes with the front roll temperature being at 240° F. and the rear roll temperature being at 185° F. The resulting roll mix in each case can then be compression molded into plates, sheeting and the like.

EXAMPLES 17–18

These examples illustrate specific embodiments of a poly(4-methyl-1-pentene) composition of this invention. The formulations of those specific compositions are—

Example 17 formulation

Components: Parts by wt.
Normally solid poly(4-methyl-1-pentene) ____ 100
1,4-bis(2-hydroxy-5-methylbenzoyl)-n-butene _ 5

Example 18 formulation

Components:
Normally solid poly(4-methyl-1-pentene) ____ 100
1,8 - bis(2 - hydroxy - 5 - methylbenzoyl) - n-
octane _____ 5

The specific compositions of the foregoing formulations are prepared by dissolving the resin in tetralin and then admixing the additive component with the resulting solution with stirring at 145° C. for one hour. The resulting dope can then be cast as a film and the tetralin evaporated.

Samples of specific embodiments of the poly-α-olefin composition of this invention have actually been prepared and tested. The tests employed are described as follows:

*Outdoor weathering 10-week carbonyl increase test.*—In this test, a specimen of the sample under test was analyzed by infrared to determine the concentration of carbonyl groups. It was then placed outdoors at Kingsport, Tenn., on a rack adapted to position the specimen at an angle of 36.5° to the horizontal. At the end of 10 weeks' exposure, the specimen was removed and again analyzed by infrared to determine the concentration of carbonyl groups. The increase in carbonyl concentration was then calculated.

*Artificial weathering embrittlement test.*—In this test, thin film specimens of the sample were exposed to ultraviolet light in a modified Atlas Twin-Arc Weather-Ometer [Anal. Chem. 25, 460 (1953)]. Periodically a specimen was removed and inspected for embrittlement when creased with the exposed side of the film specimen on the outside of the crease. When a specimen broke on creasing, the sample was deemed to have failed. The exposure time required to reach failure was then determined. From this exposure time datum obtained relative to a sample containing an additive under investigation and similar exposure time datum obtained on a sample without an additive, the improvement factor was calculated. The improvement factor is defined as the exposure time for failure of the sample with additive divided by exposure time for failure of sample without additive.

*Artificial weathering stress crack test.*—In this test, three specimens of the sample were bent into U-shape and, while so bent, were inserted upside down into a channel. The channel was placed into the modified Weather-Ometer and the specmens were periodically observed for the development of cracks visible to the unaided eye.

When such cracks developed in a specimen, the exposure time to bring about this condition for that specimen was calculated. When each of the specimens of a sample had developed such cracks, the average exposure time required for all these specimens to develop these cracks was calculated. This average exposure time is considered to be the stress crack free life of the sample.

Table I summarizes results obtained in the ultraviolet light stability testing of samples of specific polyethylene compositions including specific embodiments of a polyethylene composition of this invention. The samples were made in accordance with the procedure following the Examples 1–7 formulations. They were thus made from a conventional low density polyethylene of melt index 2 and the additives indicated in Table I. The concentration of the additive in each sample indicated as having an additive was one part by weight per 100 parts by weight of the polyethylene. The resulting roll mixes in each case were compression molded into flat plates 60 mils thick and the plates were then subjected to the Outdoor Weathering 10 Week Carbonyl Increase Test.

TABLE I

| Sample No. | Additive | Increase in Carbonyl Concentration After Ten Weeks of Exposure |
|---|---|---|
| 1 | None | 18.2 |
| 2 | 2'-hydroxy-4'-methoxybenzophenone | 1.8 |
| 3 | 2'-hydroxy-5'-methylbenzophenone | 15 |
| 4 | 1,8-bis(2-hydroxy-5-chlorobenzoyl)-n-octane | 15 |
| 5 | 1,2-bis(2-hydroxy-5-methylbenzoyl)ethane | 0.0 |
| 6 | 1,4-bis(2-hydroxy-4-methylbenzoyl)-n-butane | 0.0 |
| 7 | 1,4-bis(2-hydroxy-5-methylbenzoyl)-n-butane | 0.0 |
| 8 | 1,4-bis(2-hydroxy-3-t-butyl-5-methylbenzoyl)-n-butane | 0.0 |
| 9 | 1,6-bis(2-hydroxy-5-methylbenzoyl)-n-hexane | 0.0 |
| 10 | 1,8-bis(2-hydroxy-4-methoxybenzoyl)-n-octane | 0.0 |
| 11 | 1,8-bis(2-hydroxy-5-methylbenzoyl)-n-octane | 0.0 |

Samples 5–11 correspond in formulation to the specific compositions of Examples 1–7, respectively.

The data of Table I show that the α,ω-bis(2-hydroxybenzoyl)alkanes of this invention are highly effective ultraviolet light stabilizers for polyethylene. Moreover, comparison of the test result of Sample 10 with the test result of Sample 2 and of the test results of Samples 5, 7, 8, 9 and 11 with the test results of Samples 3 and 4 shows that the α,ω-bis(2-hydroxybenzoyl)alkanes of this invention are more effective ultraviolet light stabilizers for polyethylene than similar compounds.

Table II summarizes the results obtained in the ultraviolet light stability testing of samples of specific polypropylene compositions including specific embodiments of a polypropylene composition of this invention. The samples were prepared from a conventional, crystalline polypropylene powder having an inherent viscosity of 1.6. Each sample was prepared by mixing together at 145° C. for one hour 0.4 gram of the polypropylene powder, 0.02 gram of the additive where an additive is indicated in the table for that sample, and 10 milliliters of tetralin. The resulting dope was cast onto a ferro-type plate at a temperature of 143° C. After 10 minutes, during which most of the tetralin had evaporated, the plate and film were quenched in water and the resultant tough and transparent film of 3 mils thickness was peeled from the plate. Test specimens were cut from this film and subjected to the Artificial Weathering Embrittlement Test.

TABLE II

| Sample No. | Additive | Improvement Factor |
|---|---|---|
| 1 | None | 1.0 |
| 2 | 2'-hydroxy-4'-methylbenzophenone | 2.0 |
| 3 | 2'-hydroxy-4'-methoxybenzophenone | 2.0 |
| 4 | 2'-hydroxy-5'-methylbenzophenone | 1.5 |
| 5 | 1,8-bis(2-hydroxy-5-chlorobenzoyl)-n-octane | 3.0 |
| 6 | 1,2-bis(2-hydroxy-5-methylbenzoyl)ethane | 7.6 |
| 7 | 1,4-bis(2-hydroxy-4-methylbenzoyl)n-butane | 4.5 |
| 8 | 1,4-bis(2-hydroxy-5-methylbenzoyl)-n-butane | 7.6 |
| 9 | 1,4-bis(2-hydroxy-3-t-butyl-5-methylbenzoyl)-n-butane | 5.0 |
| 10 | 1,6-bis(2-hydroxy-5-methylbenzoyl)-n-hexane | 4.0 |
| 11 | 1,8-bis(2-hydroxy-4-methoxybenzoyl)-n-octane | 6.0 |
| 12 | 1,8-bis(2-hydroxy-5-methylbenzoyl)-n-octane | 10.0 |

Samples 6–12 correspond in formulation to the compositions of Examples 8–14, respectively.

The data of Table II demonstrate the outstanding effectiveness of the α,ω-bis(2-hydroxybenzoyl)alkanes of this invention in protecting normally solid polypropylene from the degradative effects of ultraviolet light. Moreover, as a comparison of the test result of Sample 7 with the test result of Sample 2, the test result of Sample 11 with the test result of Sample 3, and the test results of Samples 6, 8, 9, 10 and 12 with the test results of Samples 4 and 5 shows, the α,ω-bis(2-hydroxybenzoyl)alkanes of this invention are more effective ultraviolet light stabilizers for polypropylene than similar compounds.

Table III summarizes the results obtained in the testing of samples of specific poly(1-butene) compositions. The samples were prepared in accordance with the procedure described after the Examples 15 and 16 formulations from a conventional, normally solid poly(1-butene) having an inherent viscosity of 1.29, and the additives indicated in the following Table III. The additive concentration in each case was 1 part by weight of additive per 100 parts by weight of resin. In each case, the roll mix of each test sample was compression molded into flat plates 125 mils thick. Test specimens 1.5 inches by 0.5 inch were cut from these plates and mounted in 0.5 inch wide stainless steel channels for the Artificial Weathering Stress Crack Test.

TABLE III

| Sample No. | Additive | Stress Crack Free Life In Hours |
|---|---|---|
| 1 | None | 40 |
| 2 | 2'-Hydroxy-5'-methylbenzophenone | 70 |
| 3 | 1,4-bis(2-hydroxy-5-methylbenzoyl)-n-butane | 130 |
| 4 | 1,8-bis(2-hydroxy-5-methylbenzoyl)-n-octane | 180 |

Samples 3 and 4 correspond in formulation to the compositions of Examples 15 and 16, respectively.

The data of Table III demonstrate the outstanding effectiveness of the α,ω-bi(2-hydroxybenzoyl)alkanes of this invention in protecting normally solid poly(1-butene) from the degradative effects of ultraviolet light. In addition, the data of Table III illustrate that the α,ω-bis(2-hydroxybenzoyl)alkanes are more effective in protecting normally solid poly(1-butene) relative to ultraviolet light than a similar compound.

Table IV summarizes the results obtained in the testing of samples of specific poly(4-methyl-1-pentene) compositions. The samples were prepared in accordance with the procedure described after the Examples 17 and 18 formulations from a conventional, normally solid poly(4-methyl-1-pentene) having an inherent viscosity of 2.58 and a melting point of 210–213° C. The additive concentration of each sample where an additive was involved as indicated in the following Table IV was 5 parts by weight of additive per 100 parts by weight of resin. In each case, the resulting dope was cast on a ferro-type plate and the tetralin evaporated therefrom for 10 minutes at 143° C. Specimens 2.5 inches by 0.5 inch were cut from the resulting films and subjected to the Artificial Weathering Embrittlement Test.

TABLE IV

| Sample No. | Additive | Improvement Factor |
|---|---|---|
| 1 | None | 1.0 |
| 2 | 2'-hydroxy-5'-methylbenzophenone | 1.5 |
| 3 | 1,4-bis(2-hydroxy-5-methylbenzoyl)-n-butane | 4 |
| 4 | 1,8-bis(2-hydroxy-5-methylbenzoyl)-n-octane | 6 |

Samples 3 and 4 correspond in formulation to the composition of Examples 17 and 18, respectively.

The data of Table IV illustrate that the α,ω-bis(2-hydroxybenzoyl)alkanes of this invention are highly effective in protecting poly(4-methyl-1-pentene) against the degradative effects of ultraviolet light. Moreover, these data illustrate that the α,ω-bis(2-hydroxybenzoyl)alkanes of this invention are more effective ultraviolet light stabilizers for poly(4-methyl-1-pentene) than a similar compound.

Similar results are obtained when α,ω-bis(2-hydroxybenzoyl)alkanes of this invention are incorporated into other α-olefin resins.

Thus, this poly-α-olefin aspect of the present invention provides a poly-α-olefin composition protected to a high degree against the degradative effects of ultraviolet light.

A feature of advatange of the composition of this invention is that upon exposure to ultraviolet light no color development occurs due to the presence of the ultraviolet light stabilizer of this invention. Moreover, the poly-α-olefin composition of this invention does not readily lose the α,ω-bis(2-hydroxybenzoyl)alkane of this invention either by way of volatilization during normal processing of the poly-α-olefin compositions into useful articles, or by way of exudation from the composition.

THE POLYESTER STABILIZER ASPECT OF THIS INVENTION

The normally solid, polyester portion of the normally solid stabilized polyester compositions of this invention consists essentially of at least one, normally solid, polyester. A polyester is a polymer having recurrent ester groups

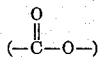

A common type of polyester is one derived from polybasic carboxylic acids and polyhydric alcohols. This invention, however, is not limited to any particular type of polyester. In fact, the α,ω-bis(2-hydroxybenzoyl)alkanes of this invention are effective ultraviolet light stabilizers for all types of polyesters including those which are hydroxyl terminated, carboxyl terminated, saturated, unsaturated, all hydrocarbon (other than the —COO— group), nitrogen containing, sulfa containing and the like. This includes, for example, all of these polyesters, referred to by group or by species, described in the text, "Polyesters and Their Applications," by the Bjorksten Research Laboratories, Inc., published by the Reinhold Publishing Corporation, New York (1956), as well as all of those polyester resins that can be manufactured via the processes described in this text. For example, this includes both unsaturated and saturated polyesters. Many examples of polyesters can be found in the disclosures of U.S. Patents 3,150,208; 3,188,363; 3,196,131; 3,197,439; 3,205,284; and 3,222,421, are generally, although not necessarily, made by a suitable polycondensation reaction of an unsaturated di- (or poly) carboxylic acid and a di- (or poly)ol. Typical dicarboxylic acids are fumaric acid, maleic acid, maleic anhydride, allylmalonic acid, allylmalonic anhydride, isopropylidene malonic acid, isopropylidene malonic anhydride, itaconic acid, itaconic anhydride, citraconic acid, citraconic anhydride, mesaconic acid, glutaconic acid, glutaconic anhydride, dimethylitaconic acid, methylene glutaric acid, allyl succinic acid, trimethyl glutaconic acid, and diethyl maleic acid. Typical diols include, but are not limited to the following: Illustrative of the alkanediols and oxyalkanediols are ethylene glycol, propylene glycol, 1,3-butanediol, 1,4-butanediol, neopentyl glycol, 1,6-hexandiol, 1,8-octanediol, diethylene glycol, triethylene glycol, tetraethylene glycol, dipropylene glycol, and tripropylene glycol. Polyhydroxy materials such as glycerin, pentaerythritol, hexane triol, sucrose, and the like can also be used.

Typical of the "saturated polyesters" are those having a linear, chainlike structure, many of which are useful in the manufacture of fibers. For example, this class of polyesters include those made from dibasic saturated acids plus saturated glycols and include the polymethylene terephthalates, polymethylene isophthalate, the reaction products of diphenoxyethane 4,4'-dicarboxylic acid, benzophenone 4,4'-dicarboxylic acid, or 1,5-, 2,6- or 2,7-naphthalene dicarboxylic acid with, for example, bis(beta-oxyethyl)derivatives of diphenols, trans-quinitol, or an acetylated diphenol, and the like.

The normally solid, polyester portion of the plastic compositions of this (polyester) particular aspect of the present invention, in addition to at least one normally solid polyester, can also comprise one or more other polymeric components.

The stabilized polyester compositions of this invention can be made by incorporating an α,ω-bis(2-hydroxybenzoyl)alkane of this invention into the polyester portion. Such incorporation can be accomplished by any of the usual melt compounding and dope compounding procedures employed for polyester compositions. A feature of advantage of this invention, however, is the thermal stability of the α,ω-bis(2-hydroxybenzoyl)alkanes. Hence, the polyester plastic composition of this invention can also be made by incorporating an α,ω-bis(2-hydroxybenzoyl)alkane into the mixture of monomers for the polyester, and then polymerizing the monomers to form the polyester portion of the composition.

The polyester aspect of the present invention is further illustrated by the following examples of specific embodiments thereof. Unless otherwise indicated, this invention is not limited to these specific embodiments.

EXAMPLES 1–7

These examples illustrate specific embodiments of the plastic composition of this invention.

The basic formulations employed in making these specific compositions are as follows.

*Example 1 formulation*

Ingredients:                                     Quantities
  Dimethyl terephthalate _____grams__ 77.6
  1,4-cyclohexanedimethanol _____do____ 86.4
  Polymerization catalyst solution __milliliters__ 1.2
  1,2-bis(2-hydroxy-5-methylbenzoyl)ethane
                                            grams__ 1.5

*Example 2 formulation*

Ingredients:
  Dimethyl terephthalate _____grams__ 77.6
  1,4-cyclohexanedimethanol _____do____ 86.4
  Polymerization catalyst solution __milliliters__ 1.2
  1,4-bis(2-hydroxy-4-methylbenzoyl)-n-butane
                                            grams__ 1.5

*Example 3 formulation*

Ingredients:
  Dimethyl terephthalate _____grams__ 77.6
  1,4-cyclohexanedimethanol _____do____ 86.4
  Polymerization catalyst solution __milliliters__ 1.2
  1,4-bis(2-hydroxy-5-methylbenzoyl)-n-butane
                                            grams__ 1.5

*Example 4 formulation*

Ingredients:
  Dimethyl terephthalate _____grams__ 77.6
  1,4-cyclohexanedimethanol _____do____ 86.4
  Polymerization catalyst solution __milliliters__ 1.2
  1,4-bis(2-hydroxy-3-t-butyl-5-methylbenzoyl)-
    n-butane _____grams__ 1.5

*Example 5 formulation*

Ingredients:
  Dimethyl terephthalate _____grams__ 77.6
  1,4-cyclohexanedimethanol _____do____ 86.4
  Polymerization catalyst solution __milliliters__ 1.2
  1,6-bis(2-hydroxy-5-methylbenzoyl)-n-hexane
                                            grams__ 1.5

*Example 6 formulation*

Ingredients:
  Dimethyl terephthalate _____grams__ 77.6
  1,4-cyclohexanedimethanol _____do____ 86.4
  Polymerization catalyst solution __milliliters__ 1.2
  1,8-bis(2-hydroxy-4-methoxybenzoyl)-n-octane
                                            grams__ 1.5

*Example 7 formulation*

Ingredients:
  Dimethyl terephthalate _____grams__ 77.6
  1,4-cyclohexanedimethanol _____do____ 86.4
  Polymerization catalyst solution __milliliters__ 1.2
  1,8-bis(2-hydroxy-5-methylbenzoyl)-n-octane
                                            grams__ 1.5

A suitable polymerization catalyst solution for each of these formulation is a 14% by weight solution of $NaHTi(OC_4H_9)_3$ in butanol.

The specific polyester compositions based on these formulations are made by admixing the ingredients and then in each case establishing and maintaining the temperature of the resulting mixture at 290° C. for 30 minutes while stirring the mixture. Then, in each case, the temperature of the mixture is raised to 325–330° C. and a vacuum of 0.1 millimeter mercury pressure is applied for 40 minutes while the reaction mixture is stirred. Thereafter, the reaction mixture, in each case now a polyester composition, is cooled to room temperature (20–25° C.) under nitrogen.

The resulting polyester composition is a normally solid plastic composition useful in films, fibers and the like. For film use, it can be melted at 290° C. and the hot melt extruded into a film of the desired thickness.

Samples of the specific polyester compositions of these formulations and of other formulations were actually made and tested for color formation on extrusion and for ultraviolet light stability. Each sample was made by the foregoing procedure from 77.6 grams (0.4 mole) of dimethyl terephthalate, 86.4 grams (0.6 mole) of 1,4-cyclohexanedimethanol, 1.2 milliliters of a 14% by weight solution of $NaHTi(OC_4H_9)_3$ in butanol and, where indicated in the following Table 1, 1.5 grams of the indicative additive. In each case a film specimen of 5 mils thickness was extruded from the resulting sample of the polyester composition. In each case, color of the film specimen after extrusion was observed. In the ultraviolet light stability testing the film specimens of the samples were placed into a modified Atlas Twin-Arc Weather-Ometer [Anal. Chem. 25, 460 (1953)]. After 700 hours of exposure in the Weather-Ometer, the specimens were removed and observed for surface appearance. Table I summarizes the results.

TABLE I

| Sample No. | Additive | Color After Extrusion | Surface Appearance After 700 Hours Exposure |
| --- | --- | --- | --- |
| 1 | None | None | Dull. |
| 2 | 2'-hydroxy-5'-methylbenzophenone | Light Amber | Glossy. |
| 3 | 1,2-bis(2-hydroxy-5-methylbenzoyl)ethane | None | Do. |
| 4 | 1,4-bis(2-hydroxy-4-methylbenzoyl)-n-butane | do | Do. |
| 5 | 1,4-bis(2-hydroxy-5-methylbenzoyl)-n-butane | do | Do. |
| 6 | 1,6-bis(2-hydroxy-5-methylbenzoyl)-n-hexane | do | Do. |
| 7 | 1,8-bis(2-hydroxy-4-methoxybenzoyl)-n-octane | do | Do. |
| 8 | 1,8-bis(2-hydroxy-5-methylbenzoyl)-n-octane | do | Do. |

Samples 3-8 correspond to the plastic compositions of Examples 1-3 and 5-7, respectively.

These data illustrate the effectiveness of the α,ω-bis(2-hydroxybenzoyl)alkanes of this invention in protecting polyesters relative to the degradative effects of ultraviolet light. They also illustrate the thermal stability of the α,ω-bis(2-hydroxybenzoyl)alkanes of this invention.

EXAMPLE 8

This example illustrates another specific embodiment of the normally solid plastic composition of this invention.

The formulation of this specific composition is as follows:

*Example 8 formulation*

Components: Parts by Wt.
Normally solid polyester from terephthalic acid, isophthalic acid and 1,4-cyclohexanedimethanol at a mole ratio of 0.83:0.17:1.0 _____ 100
1,8-bis(2-hydroxy-5-methylbenzoyl)-n-octane __ 1

The specific polyester composition of the formulations of Examples 8 through 20, above, are made by intimately mixing into already synthesized polyester in powder form the particular α,ω-bis(2-hydroxybenzoyl)alkane employed.

The resulting plastic compositions are useful in films, fibers and the like. To make film therefrom these plastic compositions are melted and then extruded.

Samples of the plastic composition of Example 8 and of other polyester compositions were actually made and tested. A powdered polyester made from terephthalic acid, isphthalic acid and 1,4-cyclohexanedimethanol at a mole ratio of 0.83:0.17:1.0 was used for each sample. 1 part by weight of additive for each 100 parts by weight of polyester, where an additive was involved, was intimately admixed with the polyester. Thereafter, each polyester sample was melted (at 290° C. for Example 8) and extruded into a film of 10 mils thickness. The film in each case was examined for color. Then the film in each case was placed into a modified Atlas Twin-Arc Weather-Ometer [Anal. Chem. 25, 460 (1953)]. Periodically, the film of each sample was examined for dulling of the exposed surface. When dulling of the surface was detected, the exposure time to reach this condition was then determined. Table II summarizes the test results.

TABLE II

| Sample No. | Additive | Color After Extrusion | Exposure Time in Hours to Dullness |
| --- | --- | --- | --- |
| 1 | None | None | 446 |
| 2 | 2'-hydroxy-5'-methylbenzophenone | Brown | 681 |
| 3 | 1,8-bis(2-hydroxy-5-methylbenzoyl)-n-octane | Very Slightly Yellow | 1,042 |

Sample 3 corresponds to the polyester composition of Example 8.

The data of Table II illustrate the outstanding effectiveness of the α,ω-bis(2-hydroxybenzoyl)alkane of this invention in protecting conventional polyesters relative to ultraviolet light. Moreover, the data illustrate the thermal stability of the α,ω-bis(2-hydroxybenzoyl)alkanes of this invention.

In general, similar beneficial results are obtained with other polyesters and the other α,ω-bis(2-hydroxybenzoyl)alkanes of this invention.

Thus, the polyester aspect of this invention provides a new polyester composition having a high degree of protection relative to the adverse effects of ultraviolet light and stabilized relative to color change due to the high temperatures normally encountered in the processing of polyester resins into useful articles.

Other advantages, features and embodiments of this invention will be apparent to those in the exercise of ordinary skill in the art after reading the foregoing disclosure. In this regard, while specific embodiments of this invention have been described in considerable detail, variations and modifications of these embodiments can be effected within the spirit and scope of this invention as disclosed and claimed.

What is claimed is:

1. A plastic composition of polymeric material selected from the group consisting of normally solid, α-olefin resins of α-monoolefins containing from 2 to 10 carbon atoms and normally solid polyester resins prepared from polyhydric alcohols and polybasic carboxylic acids and at an ultraviolet light stabilizing concentration an α,ω-bis(2-hydroxybenzoyl)alkane having the formula:

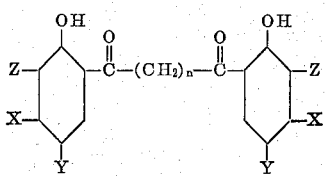

wherein $n$ is an integer in a range of from 2 to 8, and X, Y and Z are independently selected from the group consisting of hydrogen, $C_1$-$C_4$ alkoxy and $C_1$-$C_4$ alkyl radicals.

2. A plastic composition as in claim 1, wherein said polymeric material is a normally solid, α-olefin resin of an α-monoolefin containing from 2 to 10 carbon atoms.

3. A plastic composition as in claim 1, wherein the amount of said α,ω-bis(2-hydroxybenzoyl)alkane in said plastic composition is from about 0.01 to about 10% by weight, based on the weight of said normally solid α-olefin resin.

4. A plastic composition as in claim 1, wherein said polyester resin consists essentially of the polymerization product of dimethyl terephthalate and 1,4-cyclohexanedimethanol at a mole ratio of 0.4:0.6.

5. A plastic composition as in claim 1, wherein said polyester resin consists essentially of the polymerization product of terephthalic acid, isophthalic acid and 1,4-cyclohexanedimethanol at a mole ratio of 0.83:0.17:1.0.

6. A shaped article of a normally solid plastic composition consisting essentially of a normally solid polyester resin portion, said polyester being one of those prepared from polyhydric alcohols and polybasic carboxylic acids, and dispersed therein at an ultraviolet light stabilizing concentration an α,ω-bis(2-hydroxybenzoyl)alkane of the formula:

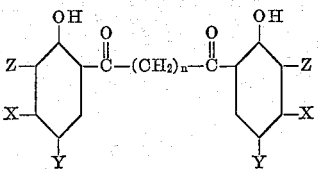

wherein $n$ is an integer in a range from 2 to 8, and X, Y and Z are independently selected from the group of hydrogen, $C_1$-$C_4$ alkoxy and $C_1$-$C_4$ alkyl radicals.

7. A shaped article of a normally solid plastic composition consisting essentially of at least one normally solid, α-olefin resin and at an ultraviolet light stabilizing concentration an α,ω-bis(2-hydroxybenzoyl)alkane of the formula:

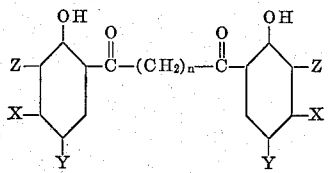

wherein $n$ is an integer in a range from 2 to 8, and X, Y and Z are independently selected from the group of hydrogen, $C_1$-$C_4$ alkoxy and $C_1$-$C_4$ alkyl radicals; said α-olefin begin an α-monoolefin which contains from 2 to 10 carbon atoms.

8. A plastic composition as in claim 1 wherein the normally solid α-olefin resin is polyethylene, polypropylene, poly(1-butene) or poly(4-methyl-1-pentene).

9. A plastic composition as in claim 1 wherein the α,ω-bis(2-hydroxybenzoyl)alkane is 1,2-bis(2-hydroxy-5-methyl-benzoyl)ethane; 1,4-bis(2-hydroxy-4-methyl-benzoyl)-n-butane; 1,4 - bis(2-hydroxy-5-methyl-benzoyl)-n-butane; 1,4-bis(2 - hydroxy-3-butyl-5-methylbenzoyl)-n-butane; 1,6-bis(2 - hydroxy-5-methyl-benzoyl)-n-hexane; 1,8-bis(2 - hydroxy-4-methoxy-benzoyl)-n-octane or 1,8-bis(2-hydroxy-5-methylbenzoyl)-n-octane.

References Cited by the Examiner
UNITED STATES PATENTS

| | | | |
|---|---|---|---|
| 2,890,193 | 6/1959 | Hardy | 260—45.95 |
| 3,001,970 | 9/1961 | Ebel et al. | 260—45.7 |
| 3,123,647 | 3/1964 | Duennenberger et al. | 260—45.95 |
| 3,157,619 | 11/1964 | Bell et al. | 260—45.95 |

LEON J. BERCOVITZ, *Primary Examiner.*

H. E. TAYLOR, JR., *Assistant Examiner.*